(12) United States Patent
Jenne et al.

(10) Patent No.: US 7,085,846 B2
(45) Date of Patent: Aug. 1, 2006

(54) BUFFER TO BUFFER CREDIT FLOW CONTROL FOR COMPUTER NETWORK

(75) Inventors: John E. Jenne, Houston, TX (US); Mark Lyndon Oelke, Spring, TX (US); Sompong Paul Olarig, Pleasanton, CA (US)

(73) Assignee: Maxxan Systems, Incorporated, Santa Clara County, CA (US)

( * ) Notice: Subject to any disclaimer, the term of this patent is extended or adjusted under 35 U.S.C. 154(b) by 618 days.

(21) Appl. No.: 10/039,184

(22) Filed: Dec. 31, 2001

(65) Prior Publication Data

US 2003/0126223 A1    Jul. 3, 2003

(51) Int. Cl.
*G06F 15/16* (2006.01)

(52) U.S. Cl. ............ 709/232; 709/234; 709/235; 370/231; 370/235

(58) Field of Classification Search ......... 709/232, 709/233–235, 213, 223–224, 238, 227–228; 370/229–331
See application file for complete search history.

(56) References Cited

U.S. PATENT DOCUMENTS

| | | | |
|---|---|---|---|
| 4,755,930 A | 7/1988 | Wilson, Jr. et al. | 364/200 |
| 5,140,682 A | 8/1992 | Okura et al. | 395/425 |
| 5,247,649 A | 9/1993 | Bandoh | 395/425 |
| 5,515,376 A | 5/1996 | Murthy et al. | 370/85.13 |
| 5,530,832 A | 6/1996 | So et al. | 395/449 |
| 5,602,841 A | 2/1997 | Lebizay et al. | 370/413 |
| 5,611,049 A | 3/1997 | Pitts | 395/200.09 |
| 5,699,548 A | 12/1997 | Choudhury et al. | 395/469 |
| 5,778,429 A | 7/1998 | Sukegawa et al. | 711/129 |
| 5,835,756 A | 11/1998 | Caccavale | 395/601 |
| 5,835,943 A | 11/1998 | Yohe et al. | 711/118 |
| 5,845,280 A | 12/1998 | Treadwell, III et al. | 707/8 |
| 5,845,324 A | 12/1998 | White et al. | 711/128 |
| 5,852,717 A | 12/1998 | Bhide et al. | 395/200.33 |
| 5,864,854 A | 1/1999 | Boyle | 707/10 |
| 5,873,100 A | 2/1999 | Adams et al. | 707/204 |
| 5,878,218 A | 3/1999 | Maddalozzo, Jr. et al. | 395/200.43 |
| 5,881,229 A | 3/1999 | Singh et al. | 395/200.33 |
| 5,918,244 A | 6/1999 | Percival | 711/119 |
| 5,930,253 A | 7/1999 | Brueckheimer et al. | 370/395 |
| 5,933,849 A | 8/1999 | Srbljic et al. | 711/118 |
| 5,944,780 A | 8/1999 | Chase et al. | 709/201 |
| 5,944,789 A | 8/1999 | Tzelnic et al. | 709/214 |
| 5,978,841 A | 11/1999 | Berger | 709/217 |
| 5,978,951 A | 11/1999 | Lawler et al. | 714/758 |
| 5,987,223 A | 11/1999 | Narukawa et al. | 395/109 |
| 5,991,810 A | 11/1999 | Shapiro et al. | 709/229 |
| 6,041,058 A | 3/2000 | Flanders et al. | 370/401 |
| 6,044,406 A * | 3/2000 | Barkey et al. | 709/235 |
| 6,081,883 A | 6/2000 | Popelka et al. | 712/28 |
| 6,085,234 A | 7/2000 | Pitts et al. | 709/217 |

(Continued)

OTHER PUBLICATIONS

PCT International Search Report PCT/US01/47769, 3 pages, Mailing Date Apr. 23, 2002.

(Continued)

*Primary Examiner*—Philip B. Tran
(74) *Attorney, Agent, or Firm*—Baker Botts L.L.P.

(57) ABSTRACT

A system and method for providing flow control for a computer network is disclosed. In one embodiment of the present invention, buffer-to-buffer credit flow control is implemented to limit the amount of data a port may send based on the number and size of the frames sent from that port.

6 Claims, 5 Drawing Sheets

U.S. PATENT DOCUMENTS

| | | | |
|---|---|---|---|
| 6,098,096 A | 8/2000 | Tsirigotis et al. | 709/213 |
| 6,128,306 A | 10/2000 | Simpson et al. | 370/412 |
| 6,138,209 A | 10/2000 | Krolak et al. | 711/128 |
| 6,147,976 A | 11/2000 | Shand et al. | 370/254 |
| 6,243,358 B1* | 6/2001 | Monin | 370/229 |
| 6,289,386 B1* | 9/2001 | Vangemert | 709/232 |
| 6,400,730 B1 | 6/2002 | Latif et al. | 370/466 |
| 6,484,209 B1 | 11/2002 | Momirov | 709/238 |
| 6,532,501 B1* | 3/2003 | McCracken | 710/52 |
| 6,584,101 B1 | 6/2003 | Hagglund et al. | 370/389 |
| 6,594,701 B1* | 7/2003 | Forin | 709/232 |
| 6,597,699 B1 | 7/2003 | Ayres | 370/400 |
| 6,615,271 B1* | 9/2003 | Lauck et al. | 709/232 |
| 6,657,962 B1* | 12/2003 | Barri et al. | 370/235 |
| 6,687,247 B1 | 2/2004 | Wilford et al. | 370/392 |
| 6,721,818 B1 | 4/2004 | Nakamura | 710/9 |
| 6,731,644 B1 | 5/2004 | Epps et al. | 370/412 |
| 6,735,174 B1* | 5/2004 | Hefty et al. | 709/235 |
| 6,747,949 B1* | 6/2004 | Futral | 370/241 |
| 6,757,791 B1 | 6/2004 | O'Grady et al. | 711/154 |
| 6,765,871 B1* | 7/2004 | Knobel et al. | 370/231 |
| 6,765,919 B1 | 7/2004 | Banks et al. | 370/401 |
| 6,785,241 B1* | 8/2004 | Lu et al. | 370/241 |
| 6,792,507 B1 | 9/2004 | Chiou et al. | 711/119 |
| 2001/0037435 A1 | 11/2001 | Van Doren | 711/153 |
| 2001/0043564 A1* | 11/2001 | Bloch et al. | 370/230 |
| 2002/0004842 A1* | 1/2002 | Ghose e al. | 709/235 |
| 2002/0010790 A1 | 1/2002 | Ellis et al. | 709/238 |
| 2002/0012344 A1* | 1/2002 | Johnson et al. | 370/389 |
| 2002/0024953 A1 | 2/2002 | Davis et al. | 370/395.1 |
| 2002/0071439 A1 | 6/2002 | Reeves et al. | 370/400 |
| 2002/0186703 A1* | 12/2002 | West et al. | 370/413 |
| 2002/0188786 A1 | 12/2002 | Barrow et al. | 710/300 |
| 2003/0002506 A1 | 1/2003 | Moriwaki et al. | 370/392 |
| 2003/0012204 A1 | 1/2003 | Czeiger et al. | 370/401 |
| 2003/0014540 A1 | 1/2003 | Sultan et al. | 709/240 |
| 2003/0048792 A1 | 3/2003 | Xu et al. | 370/400 |
| 2003/0063348 A1 | 4/2003 | Posey, Jr. | 359/139 |
| 2003/0074449 A1* | 4/2003 | Smith et al. | 709/226 |
| 2003/0084219 A1 | 5/2003 | Yao et al. | 710/300 |
| 2003/0093541 A1 | 5/2003 | Lolayekar et al. | 709/230 |
| 2003/0093567 A1 | 5/2003 | Lolayekar et al. | 709/246 |
| 2003/0126297 A1 | 7/2003 | Olarig et al. | 709/250 |
| 2003/0128703 A1 | 7/2003 | Zhao et al. | 370/392 |
| 2003/0154301 A1 | 8/2003 | McEachern et al. | 709/237 |
| 2003/0163555 A1 | 8/2003 | Battou et al. | 709/223 |
| 2003/0195956 A1 | 10/2003 | Bramhall et al. | 709/223 |
| 2003/0198231 A1 | 10/2003 | Kalkunte et al. | 370/395.31 |
| 2003/0202520 A1 | 10/2003 | Witkowski et al. | 370/400 |
| 2005/0018619 A1 | 1/2005 | Banks et al. | 370/254 |
| 2005/0243734 A1 | 11/2005 | Nemirovsky et al. | 370/252 |

OTHER PUBLICATIONS

U.S. Appl. No. 10/117,418 entitled "System and Method for Linking a Plurality of Network Switches," filed Apr. 5, 2002 by Ram Iyer et al.

U.S. Appl. No. 10/117,040 entitled "System and Method for Expansion of Computer Network Switching System Without Disruption Thereof," filed Apr. 5, 2002 by Mark Oelke et al.

U.S. Appl. No. 10/117,266 entitled "System and Method for Guaranteed Link Layer Flow Control," filed Apr. 5, 2002 by Hani Ajus et al.

U.S. Appl. No. 10/117,638 entitled "Fibre Channel Implementation Using Network Processors," filed Apr. 5, 2002 by Yao Hawkins et al.

U.S. Appl. No. 10/117,290 entitled "Method and System for Reduced Distributed Event Handling in a Network Environment," filed Apr. 5, 2005 by Huang Ruotao et al.

* cited by examiner

BUFFER TO BUFFER CREDIT FLOW CONTROL FOR COMPUTER NETWORK

CROSS-REFERENCE TO RELATED APPLICATIONS

This application is related to U.S. patent application publication number 20020078299, titled "Caching System and Method for a Network Storage System" by Lin-Sheng Chiou, Mike Witkowski, Hawkins Yao, Cheh-Suei Yang, and Sompong Paul Olarig, which was filed on Dec. 14, 2000, now U.S. Pat. No. 6,792,507 and which is incorporated herein by reference in its entirety for all purposes; U.S. patent application Ser. No. 10/015,047, titled "System, Apparatus and Method for Address Forwarding for a Computer Network" by Hawkins Yao, Cheh-Suei Yang, Richard Gunlock, Michael L. Witkowski, and Sompong Paul Olarig, which was filed on Oct. 26, 2001 and which is incorporated herein by reference in its entirety for all purposes; U.S. patent application Ser. No. 20030200330, titled "System And Method For Load-Sharing Computer Network Switch" by Sompong Paul Olarig, Mark Lyndon Oelke, and John E. Jenne, which was filed on Apr. 22, 2002, and which is incorporated herein by reference in its entirety for all purposes; U.S. patent application Ser. No. 10/039,190, titled "Network Processor Interface System" by Sompong Paul Olarig, Mark Lyndon Oelke and John E. Jenne, which is being filed concurrently on Dec. 31, 2001, and which is incorporated herein by reference in its entirety for all purposes; and U.S. patent application Ser. No. 10/039,189, titled "Xon/Xoff Flow Control for Computer Network" by Hawkins Yao, John E. Jenne and Mark Lyndon Oelke, which is being filed concurrently on Dec. 31, 2001, and which is incorporated herein by reference in its entirety for all purposes.

FIELD OF THE INVENTION

The present invention is related to computer networks. More specifically, the present invention is related to providing flow control of information for a computer network.

BACKGROUND OF THE INVENTION TECHNOLOGY

Fibre Channel standards define protocols for link-level and end-to-end congestion control. However, these standard protocols do not eliminate head of line (HOL) blocking within a switch. HOL blocking is a problem for internal switching that occurs when several packets at the head of an input queue block packets from being forwarded to output ports. Storage Area Network (SAN) switches that share egress buffer resources are particularly susceptible to HOL blocking when they become congested because, unlike typical TCP/IP switches and routers, a SAN switch does not discard traffic when it becomes congested.

The Fibre Channel link-level flow control mechanism (buffer to buffer credits or BB Credits) is typically provided on a per-link basis to devices attached to the SAN switch. Occasionally, several ingress ports may share a pool of BB credits to receive traffic. In most SAN switches, egress congestion is not communicated to the ingress ports to limit the amount of ingress traffic. As a result, HOL blocking may occur within the switch as pools of shared memory become congested. Another major problem with buffer-to-buffer flow control model is that it is difficult to determine the number of BB Credits that are needed to efficiently move the frames. This is critical because the system needs enough credits to be able to provide a continuous flow between ports.

SUMMARY OF THE INVENTION

The invention overcomes the above-identified problems as well as other shortcomings and deficiencies of existing technologies by providing an end-to-end, e.g., ingress port to egress port, traffic flow control through a computer network at the system level.

The present invention is directed to a method for providing buffer-to-buffer credit port-level flow control for a computer network in operative communication with a plurality of ingress and egress network processors, each having an egress port and an ingress port that is associated with a buffer-to-buffer credit value corresponding to the current number of frames the ingress port may send, a buffer value corresponding to the current total frame size the ingress port may send, and a pending buffer-to-buffer value corresponding to the pending buffer-to-buffer credits an egress port may issue the ingress port.

In an exemplary embodiment of the present system and method for flow control, buffer-to-buffer flow control is implemented to manage frame traffic from a selected ingress port based on the number and size of the frames the port is permitted to send. The port is issued credits that correspond to the number and size of the frame that the port may send. These credits are decremented when a frame is sent and may be incremented when the frame reaches its destination.

The present invention is directed to a method comprising the steps of: sending a frame from the ingress port to a destination egress port, if the ingress port has a sufficient buffer-to-buffer credit value and buffer value; decrementing the buffer-to-buffer credit value associated with the ingress port; decrementing the buffer value associated with the ingress port; determining whether to increment the buffer-to-buffer credit value associated with the ingress port; incrementing the pending credit value associated with the ingress port; and determining whether to send a credit message to the ingress port. A set of network processors is associated with a bridge. The computer system may further comprise a switch fabric; and the network processors may be in operative communication with the switch fabric via the associated bridge. The step of determining whether to increment the buffer-to-buffer credit value may further comprise: incrementing the buffer-to-buffer credit value associated with the ingress port if the product of one plus the buffer-to-buffer credit value times the maximum frame size in bytes is less than or equal to a minimum egress buffering value. The minimum egress buffering value may correspond to the minimum amount of egress buffering that is available for any one egress port. The step of determining whether to send a credit message to the ingress port may further comprise: sending the credit message if the pending credit value is greater than, or equal to, a credit watermark value. The method may further comprise the step of: increasing the buffer value if the credit message is sent.

An advantage of the present flow control schemes is that HOL blocking is substantially eliminated. The present flow control schemes alleviate the problems of increased system latency, unintentionally dropped packets, and time-out situations. Another advantage of the present flow control schemes is that more efficient data streaming is provided for the computer network. Other advantages will be apparent in view of the figures and detailed description below.

BRIEF DESCRIPTION OF THE DRAWINGS

A more complete understanding of the present disclosure and advantages thereof may be acquired by referring to the following description taken in conjunction with the accompanying drawings, wherein.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF EXEMPLARY EMBODIMENTS

The present invention relates to a system and method for providing traffic flow control through a computer network, e.g., a SAN, at the system level. The presently disclosed system and method for flow control involves dynamic buffer-to-buffer flow control scheme that uses a credit/debit based scheme to manage traffic to a particular port. Generally, the flow control scheme limits the traffic associated with a selected port in the computer network based on the size and number of frames or packets that are to be passed through that port.

Figure 1:
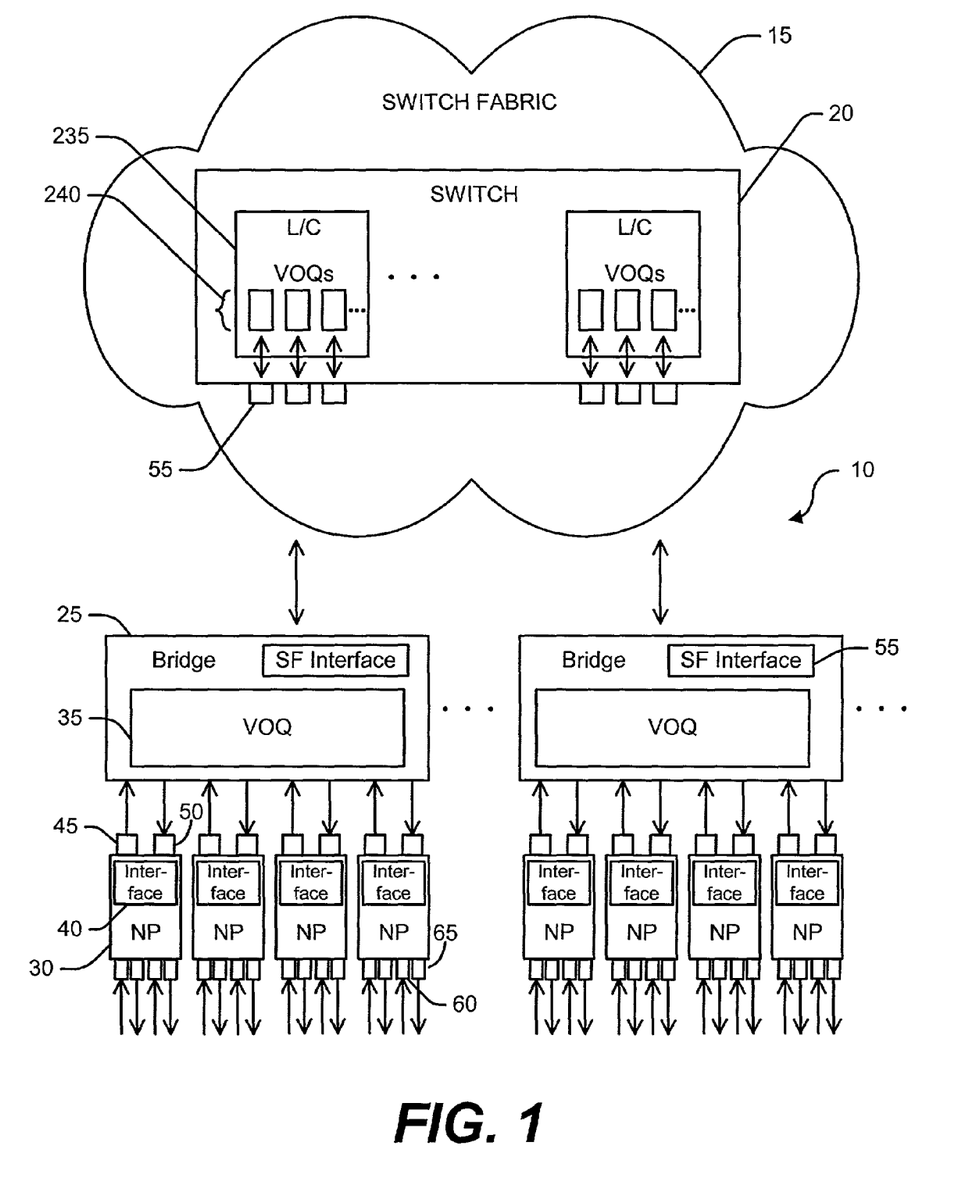
FIG. 1 is a block diagram of one exemplary embodiment of a computer network.

FIG. 1 shows a functional block diagram of a computer network 10. The exemplary embodiment of computer network 10 shown in FIG. 1 is a Fibre Channel SAN. Computer network 10 comprises a Fibre Channel protocol switching fabric 15. Switching fabric 15 comprises network switch 20. Network switch 20 may be any switch suitable for handling network traffic, such as a fibre channel switch or cross bar switch, for example. Computer network 10 also contains one or more bridge devices 25. Bridge 25 provides a connection between one or more network processors 30 and switch 20. Bridge 25 contains a switch fabric interface 55 to connect bridge 25 and switch 20. Bridge 25 may also comprise a VOQ 35 to provide a bandwidth matching function. In the particular embodiment illustrated in FIG. 1, a 512-port SAN switch may be implemented by connecting 256 network processors 30 to a 64-port switch fabric 15. Each network processor 30 has an ingress switch interface 45 and an egress switch interface 50.

For the present disclosure, the network processor 30 may merely provide limited computational capabilities and may be satisfied by even rudimentary digital processors. Any of these digital processors need not exist within the present invention. Any necessary processing can be satisfied from remote processors. In a preferred embodiment of the present invention, latency may be reduced by having the network processor 30 within the system.

In the exemplary embodiment shown in FIG. 1, each network processor 30 supports two 1 Gbps Fibre Channel ports. Each Fibre Channel port is made up of an ingress port 60 and an egress port 65. Each network processor 30 may include an interface 40. For example, network processor 30 may have an OC-48 (2.5 Gbps) CSIX interface to switch fabric 15. Switch 20 has one or more switch fabric ports 55 to provide a connection with bridges 25. Switch fabric port 55 may support any protocol operable to conduct traffic across network 10. For example, each of the switch fabric ports is an OC-192 (10 Gbps) CSIX interface. In the exemplary embodiment shown in FIG. 1, each bridge 25 connects four network processors 30 to each switch fabric port 55.

Each network processor 30 has ingress buffering that is used to implement a VOQ for each egress Fibre Channel port 65 in the system. In the example discussed above, each network processor 30 implement 512 VOQs, one for each egress Fibre Channel port 65 in the system. Each network processor 30 also has egress buffering that is used to implement at least two outbound queues, one for each egress Fibre Channel port 65 connected to the network processor 30. The network processors 30 monitor the depth of the egress buffers for each of its two Fibre Channel ports 60 and 65.

The flow-control scheme of the present disclosure utilizes a dynamic buffer-to-buffer flow control mechanism to control traffic between ports. Standard fibre channel buffer-to-buffer flow control mechanisms use a credit/debit based algorithm to control traffic between the N-Port and F-Port of a fibre channel link. Table I below shows an example of how fibre channel buffer-to-buffer flow control can be extended across the fabric switch to handle frame transfers between two network processors, "NP 1" and "NP 250."

TABLE I

Example of Two-Level Flow Control

| Step # | Action |
|---|---|
| 1 | Port 1 sends Frame A to Network Processor 1 (NP 1) |
| 2 | Port 1 decrements BB Credit |
| 3 | NP 1 receives Frame A and determines that Frame A's destination is Port 500 (attached to NP 250) |
| 4 | NP 1 sends Frame A to NP 250 across switch fabric |
| 5 | NP 250 receives Frame A |
| 6 | NP 250 queues Frame A for transmission to Port 500 |
| 7 | NP 250 sends Frame A to Port 500 |
| 8 | NP 250 creates a credit message for Frame A to send to NP 1 |
| 9 | NP 250 sends credit message to NP 1 |
| 10 | NP 1 receives credit message for Frame A |
| 11 | NP gives BB Credit to Port 1 |
| 12 | Port 1 increments BB Credit |

This example shown in Table I illustrates the fibre channel buffer-to-buffer flow control scheme may be extended all the way to the egress port within the network switch. The egress NP determines when to issue a credit message that translates into a BB Credit to the ingress port. Therefore, the egress network processor throttles the ingress port transmission rate by controlling when the BB Credit is sent. As discussed above, a major problem with this flow control model is that it is difficult to determine the number of BB Credits that are needed to efficiently moves the frames. It is important that the system has enough credits to be able to provide a continuous flow between a single ingress and egress port.

One challenge is that there is a wide range of fibre channel frame sizes. If the system uses the minimum number of BB Credits needed for a continuous flow of the largest fibre channel frames, then a stream of small fibre channel frames would be unnecessarily throttled due to a lack of BB credits. On the other hand, if the number of BB Credits is set to the number of credits needed to stream the smallest fibre channel frames, then large fibre channel frames place extreme buffering requirements on the system. To minimize the buffering requirements for large fibre channels and to enable small fibre channel frames to stream, a dynamic BB credit level flow control is needed.

The presently disclosed dynamic BB Credit flow control scheme involves byte-based connectivity between the ingress and egress network processors. The ingress network processor is permitted to send a predefined amount of traffic to an egress network processor. This traffic can be made up of a large number of small frames or a small number of large frames. Regardless of size characteristics of the traffic, the ingress network processor preferably never sends more than the predefined amount of traffic to the egress network processor. After the egress network processor has transmitted the frame out the egress port, it sends a credit to the ingress network processor with the frame size in bytes. The ingress network processor then uses this credit to increase its pool of permissible traffic.

This BB Credit flow control scheme dynamically allocates BB Credits based on the amount of egress buffering available at the egress network processor. This fibre channel buffer-to-buffer flow control scheme operates on a per-frame basis, so if there are a lot of small fibre channel frames, the BB Credits are given quickly which permits the small frames to stream. If there are a lot of large fibre channel frames, the BB Credits are given out at a slower rate that the egress port can handle. If an egress port is congested, the egress network processor gives credits back to ingress network processor at the rate it is transmitting traffic out of the network switch.

The byte-based credits sent from the egress network processor to the ingress network processor of a network switch may generate overhead that uses valuable switch fabric bandwidth. Accordingly, another embodiment of the dynamic BB Credit flow control scheme combines credit messages. Instead of generating a byte-based credit for every frame transmitted out the egress port, the BB Credit flow control scheme may combine multiple credits. The egress network processor tracks the amount of byte-based credits for each ingress port, and once a credit level was reached, the egress network processor generates a credit for the accumulated byte total. The credit level may be programmable so that the level may be defined by a user for a particular system or network. The ingress network processor tracks the amount of available egress buffer available for each egress port. BB Credits are based on the minimum amount of egress buffering available at any one egress port.

In another embodiment of the BB Credit flow control scheme, the information shown in Tables 2 and 3 is tracked at each ingress and egress port, respectively. Table II below shows the variables to be tracked at the ingress port, where N corresponds to the number of ports in the system. The Max_BB_Credit variable corresponds to the maximum number of BB Credit that may be negotiated for that port. The Cur_BB_Credit variable is the current BB Credit value for the port. Max_Buff represents the maximum amount, e.g., in bytes, of egress buffering for a single egress port. Cur_Buff is the currently available amount, e.g., in bytes, of egress buffering for a single ingress port per egress port.

TABLE II

Ingress Port Variables

| Variable | Description |
| --- | --- |
| Max_BB_Credit | maximum negotiated BB Credit count |
| Cur_BB_Credit | current BB Credit count |
| Max_Buf | maximum amount of egress buffering for a single ingress port |
| Cur_Buf[N] | current available egress buffering for a single ingress port on a per egress port basis |

Table III below shows the variables to be tracked at the egress port, where N corresponds to the number of ports in the system. Credit_Watermark is a variable that is used by the system to determine when to issue a credit back to an ingress port. Pending_Credit represents the amount of pending egress buffering credit for each ingress port.

TABLE III

Egress Port Variables

| Variable | Description |
| --- | --- |
| Credit_Watermark | watermark for determining when to issue a credit back to the ingress network processor |
| Pending_Credit[N] | amount of pending egress buffering credit for each ingress port |

Figure 2:
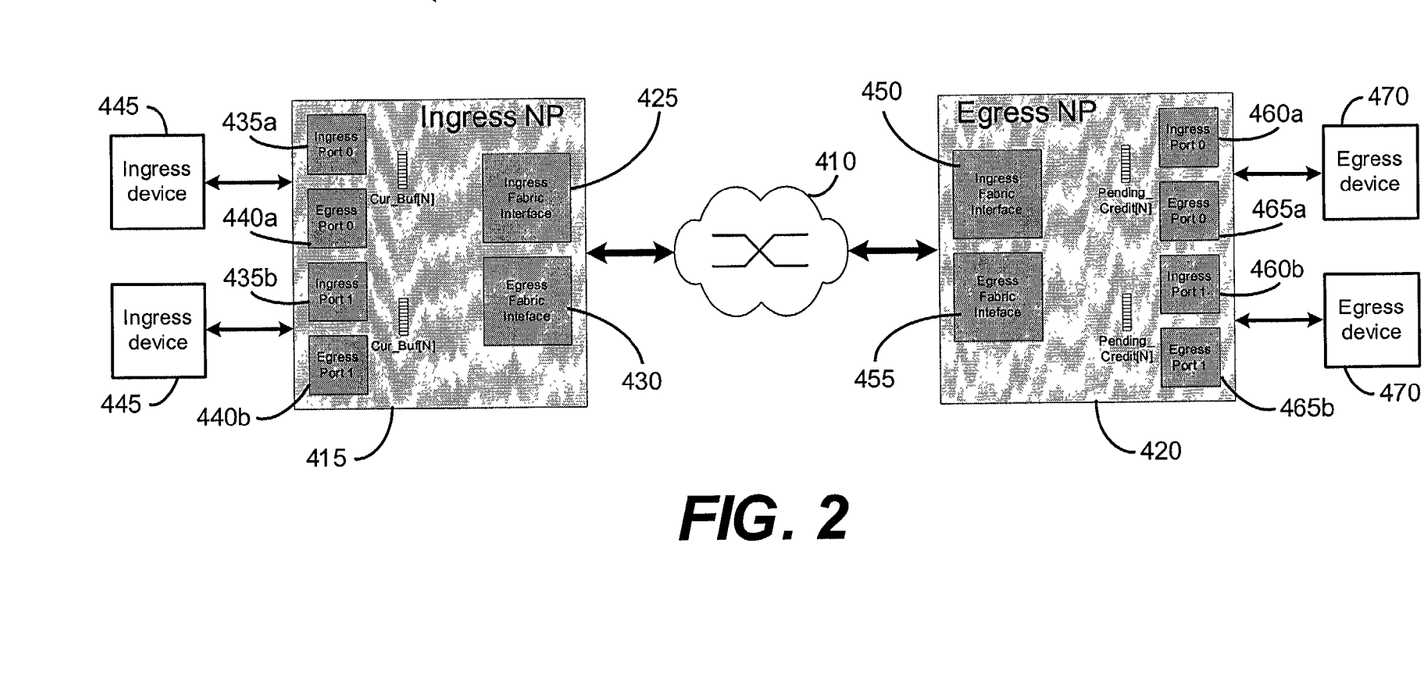
FIG. 2 is a block diagram of one exemplary embodiment of a computer network.

FIG. 2 shows a functional block diagram of computer network 400 that includes a network switch or cross bar 410. As discussed above, computer network 400 is preferably a fibre channel SAN and switch 410 is preferably a fibre-channel switch. Computer network 400 includes an ingress network processor 415 and an egress network processor 420. Ingress network processor 415 comprises an ingress fabric interface 425 and a egress fabric interface 430 that allows ingress network processor 415 to be connected to switch 410 such that traffic may be conducted between ingress network processor 415 and switch 410. Ingress network processor 415 also has one or more ingress ports 435 and egress ports 440 for accommodating traffic between ingress network processor 415 and ingress devices 445. Egress network processor 420 comprises an ingress fabric interface 450 and an egress fabric interface 455 that allows egress network processor 420 to be connected to switch 410 such that traffic may be conducted between egress network processor 420 and switch 410. Egress network processor 420 also has one or more ingress ports 460 and egress ports 465 for accommodating traffic between egress network processor 420 and egress devices 470.

Figure 3:
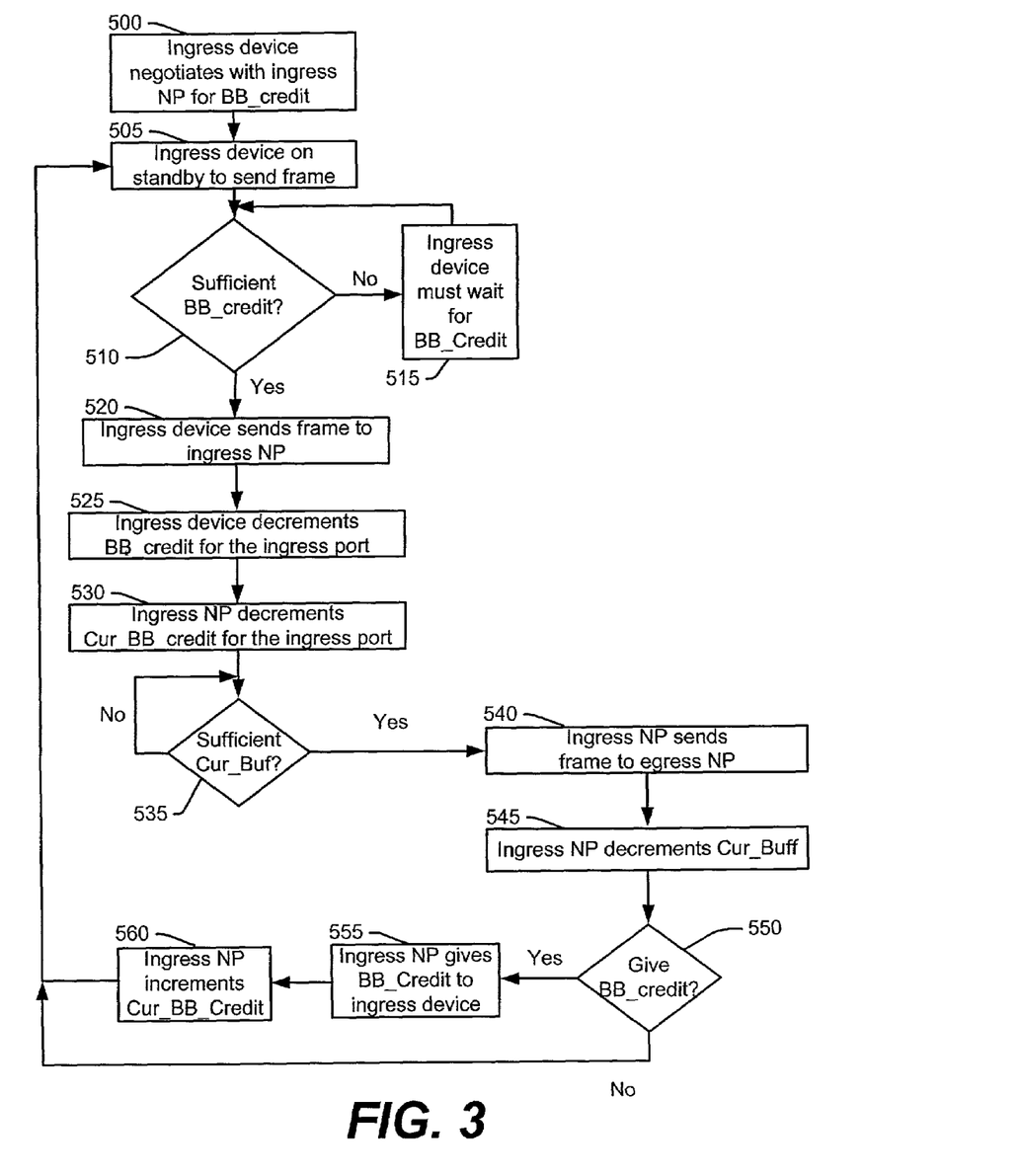
FIG. 3 is an exemplary embodiment of a BB Credit flow control scheme of the present invention.

FIG. 3 illustrates an exemplary embodiment of dynamic BB Credit flow control at the ingress network processor using the exemplary network shown in FIG. 2. Initially, at step 500, the ingress port negotiates with the ingress device for a BB Credit count and stores this value in Max_BB_Credit. The negotiation for the BB Credit value generally does not have to take into account the latency of the switch, but typically does need to recognize the latencies of the fibre channel link due to distance. For the dynamic BB Credit flow control scheme, a small BB Credit is generally preferred. Preferably, the Max_Buf value is based on configuration information that indicates the maximum buffering capability at a single egress for a single ingress. Initially, Cur_BB_Credit may be set equal to Max_BB_Credit and Cur_Buf[N] may be set equal to Max_Buf. The Credit_Watermark may be configured by software at system initialization. Preferably, the egress port variable, Pending_Credit[N] is initially set to zero.

At step 505, the ingress port is on standby to receive a frame from the ingress device. When an ingress device sends a frame to the ingress port, it must be determined whether the ingress port has sufficient BB Credit to send a frame. Generally, ingress device 445 only tracks the number of BB Credits that were negotiated. If the ingress port has insufficient BB Credit, then the frame cannot be sent at this time. Accordingly, at step 515, the ingress port must wait for a BB Credit before it may send a frame.

If it is determined at step 510 that the ingress port has a sufficient BB Credit value, then the ingress port sends the frame to the ingress network processor at step 520. The ingress device decrements its BB Credit count at step 525. The ingress NP receives the frame and decrements the ingress port's Cur_BB_Credit at step 530.

At step 530, the ingress network processor determines whether there is sufficient Cur_Buf[n] at the egress network processor to send the frame. If Cur_Buf[n] is insufficient at the egress network processor, the ingress processor must wait. If Cur_Buf[n] is sufficient, the ingress network processor sends the frame to the egress network processor at step 540. The ingress network processor then decrements Cur_Buf[n] at step 545 by the frame size plus the associated overhead.

At step 550, the ingress network processor then determines whether or not to give a BB Credit to the ingress device. If the system determines that there is sufficient egress buffering for any one egress port, then the network processor gives a BB Credit to the ingress device at step 555 and then increments the Cur_BB_Credit for the ingress port at step 560. In one embodiment of the present BB Credit flow control scheme, if $((Cur\_BB\_Credit+1)*MAX\_FC\_FRAME\_SIZE) \leq Minimum(Cur\_Buf[n])$, then the ingress network processor will immediately gives a BB Credit to the ingress device or port and increments Cur_BB_Credit. The variable Minimum (Cur_Buf[n]) is the minimum amount of egress buffering available for any one egress port. Otherwise, the ingress network processor must wait until it receives a credit message from the egress network processor, before it may increment the ingress port's BB Credit. In this particular embodiment, the system checks to see if there is enough egress buffering for all the current BB Credits plus one (assuming each BB Credit is associated with a maximum sized fibre channel frame). Typically, for Fibre Channel networks, the smallest frame is 36 bytes and the largest is 2148 bytes.

Figure 4:
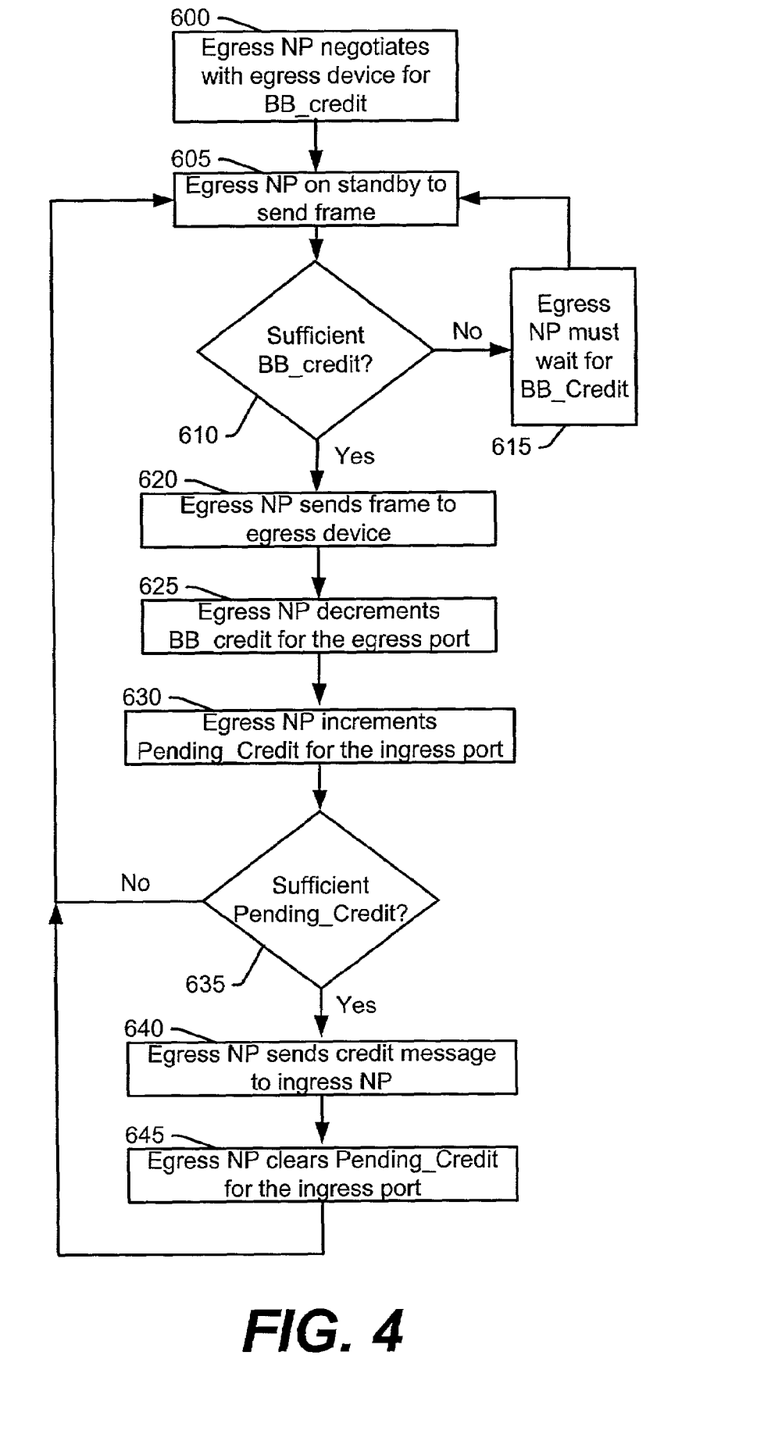
FIG. 4 is an exemplary embodiment of a BB Credit flow control scheme of the present invention.

FIG. 4 illustrates an exemplary embodiment of dynamic BB Credit flow control at the egress network processor using the exemplary network show in FIG. 2. At step 600, the egress network processor negotiates with the egress device for an acceptable BB Credit count. At step 605, the egress network processor waits for a frame to send to the egress device. Once a frame is received, the egress processor checks the BB Credit level for the egress device at step 610. If the BB Credit is insufficient, the egress network processor waits to receive a BB Credit at step 615. If the BB Credit is sufficient, the egress network processor transmits the frame to the egress device at step 620. The egress processor then decrements the BB Credit value at step 625. After transmitting the frame to an egress port, the egress network processor de-allocates the buffering needed for the frame and increments Pending_Credit[N] by the frame size plus the associated overhead for the source ingress port at step 630. Next, the system must determine whether a credit message should be sent to the ingress network port. Generally, the egress network processor will send a credit message if a sufficient amount of buffering has been made available after the frame has been routed to an egress port. Accordingly, at step 635, it is determined whether there is sufficient Pending_Credit.

In one embodiment of the present BB Credit flow control scheme, if Pending_Credit[N]≧Credit_Watermark, the egress network processor creates a credit message to send back to the ingress network processor. If the system determines that a sufficient amount of buffering is available, then a credit message is generated and sent at step 640. The credit message includes the amount of buffering freed up, which is equal to Pending_Credit[n]. The variable Pending_Credit[N] is then preferably set to zero at step 645 before preceding back to step 605. Otherwise, the flow control process proceeds to step 505 and the ingress port waits for the next frame to send.

Figure 5:
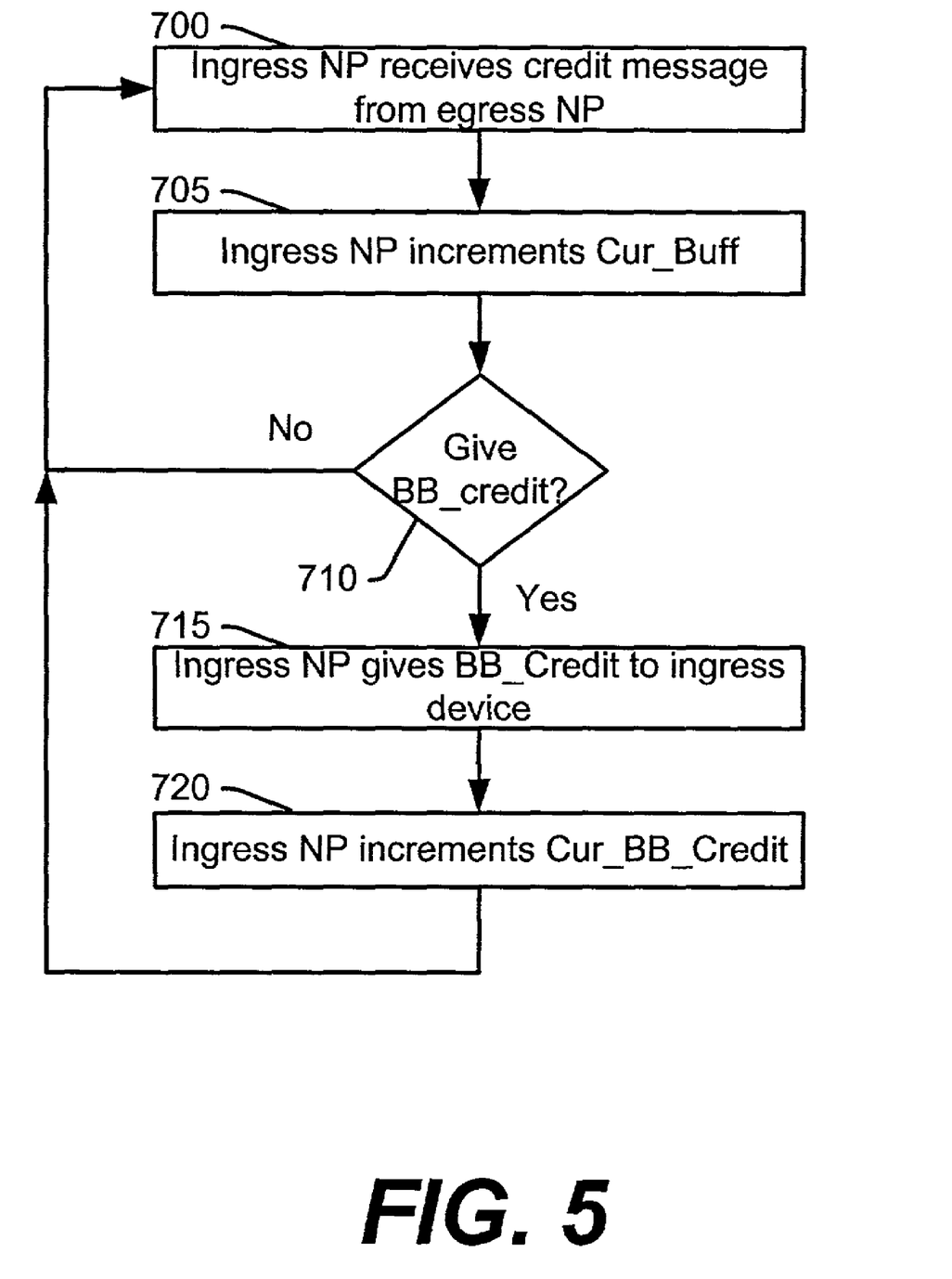
FIG. 5 is an exemplary embodiment of a BB Credit flow control scheme of the present invention.

FIG. 5 illustrates an exemplary embodiment of dynamic BB Credit flow control where the ingress network processor receives a credit message. The credit message may be a special inband control cell that is set from the egress network processor to the source ingress network processor. The credit message cell may have fields indicating the source ingress port, the destination egress port, and the amount of buffer credit in bytes. The source and destination ports may simply be indicated in the cell header addresses. When the ingress network processor receives the credit message from the egress network processor at step 700, it increments Cur_Buf[n] by the amount of buffering freed up specified in the credit message at step 705. Next, the ingress processor must determine whether to give a BB Credit to the ingress port at step 710. As discussed above, this determination depends on whether there is sufficient egress buffering. If so, then the ingress network processor sends a BB Credit to the ingress device at step 715 and then increments the ingress port's Cur_BB_Credit at step 720. In one embodiment of the present BB Credit flow control scheme, if $((Cur\_BB\_Credit+1)*MAX\_FC\_FRAME\_SIZE) \leq Minimum(Cur\_Buf[n])$, then the ingress network processor gives a BB Credit to the ingress port and increments Cur_BB_Credit. Otherwise, the ingress port must wait until Cur_Buf[n] is incremented by additional credit messages before sending a BB Credit to the ingress port. The flow control scheme then goes back to step 700 and the ingress port stands by for the next frame.

Table IV below shows an example of how the BB Credit flow control scheme controls frame traffic across the network switch 410. For the purposes of illustration, the process shown in Table IV is based on the following values: Max_BB Credit=3; Max_Buf=8 KB; Credit_Watermark=4 KB; and the maximum fibre channel frame size equals 2K. Furthermore, for the purposes of illustration, the example shown in Table IV is based on the following assumptions: all fibre channel frames are equal to the maximum fibre channel frame size; there is no overhead; and the same egress is used throughout Table IV to simplify the example.

TABLE IV

Example of Dynamic BB Credit Flow Control

| Step # | Action | Cur_BB Credit | Cur_Buf[1] | Pending_Credit[1] |
|---|---|---|---|---|
| 1 | Initialize | 3 | 8 KB | 0 KB |
| 2 | Port 1 sends Frame 1 to NP 1; decrement BB Credit | 2 | 8 KB | 0 KB |

TABLE IV-continued

Example of Dynamic BB Credit Flow Control

| Step # | Action | Cur_BB Credit | Cur_Buf[1] | Pending_Credit[1] |
|---|---|---|---|---|
| 3 | NP 1 decrements Cur_Buf[1] for Frame 1 | 2 | 6 KB | 0 KB |
| 4 | (2 + 1) * 2 KB <= 6 KB, so NP 1 immediately gives BB Credit | 3 | 6 KB | 0 KB |
| 5 | NP 1 sends Frame 1 to NP 250 via switch fabric | 3 | 6 KB | 0 KB |
| 6 | Port 1 sends Frame 2 to NP 1; decrement BB Credit | 2 | 6 KB | 0 KB |
| 7 | NP 1 decrements Cur_Buf[1] for Frame 2 | 2 | 4 KB | 0 KB |
| 8 | (2 + 1) * 2 KB > 4 KB, so NP 1 can NOT give BB Credit until a credit message is received from Egress NP | 2 | 4 KB | 0 KB |
| 9 | NP 1 sends Frame 2 to NP 250 via switch fabric | 2 | 4 KB | 0 KB |
| 10 | Port 1 sends Frame 3 to NP 1; decrement BB Credit | 1 | 4 KB | 0 KB |
| 11 | NP 1 decrements Cur_Buf[1] for Frame 3 | 1 | 2 KB | 0 KB |
| 12 | (1 + 1) * 2 KB > 2 KB, so NP 1 can NOT give BB Credit until a credit message is received from Egress NP | 1 | 2 KB | 0 KB |
| 13 | NP 1 sends Frame 3 to NP 250 via switch fabric | 1 | 2 KB | 0 KB |
| 14 | Port 1 sends Frame 4 to NP 1; decrement BB Credit | 0 | 2 KB | 0 KB |
| 15 | NP 1 decrements Cur_Buf[1] for Frame 4 | 0 | 0 KB | 0 KB |
| 16 | (0 + 1) * 2 KB > 0 KB, so NP 1 can NOT give BB Credit until a credit message is received from Egress NP | 0 | 0 KB | 0 KB |
| 17 | NP 1 sends Frame 4 to NP 250 via switch fabric | 0 | 0 KB | 0 KB |
| 18 | NP 250 receives Frame 1 and sends it to Port 500 | 0 | 0 KB | 0 KB |
| 19 | NP 250 increments Pending_Credit[n] | 0 | 0 KB | 2 KB |
| 20 | 2 KB < 4 KB, so NP 250 can NOT give a credit | 0 | 0 KB | 2 KB |
| 21 | NP 250 receives Frame 2 and sends it to Port 500 | 0 | 0 KB | 2 KB |
| 22 | NP 250 increments Pending_Credit[n] | 0 | 0 KB | 4 KB |
| 23 | 4 KB >= 4 KB, so NP 250 can give a credit | 0 | 0 KB | 0 KB |
| 24 | NP 250 sends credit message = 4 KB back to NP 1 | 0 | 0 KB | 0 KB |
| 25 | NP 1 receives credit message = 4 KB and increments Cur_Buf[1] | 0 | 4 KB | 0 KB |
| 26 | (0 + 2) * 2 KB <= 4 KB, so NP 1 gives 2 BB Credits | 2 | 4 KB | 0 KB |
| 27 | NP 250 receives Frame 3 and sends it to Port 500 | 2 | 4 KB | 0 KB |
| 28 | NP 250 increments Pending_Credit[n] | 2 | 4 KB | 2 KB |
| 29 | 2 KB < 4 KB, so NP 250 can NOT give a credit | 2 | 4 KB | 2 KB |
| 30 | NP 250 receives Frame 4 and sends it to Port 500 | 2 | 4 KB | 2 KB |
| 31 | NP 250 increments Pending_Credit[n] | 2 | 4 KB | 4 KB |
| 32 | 4 KB >= 4 KB, so NP 250 can give a credit | 2 | 4 KB | 0 KB |
| 33 | NP 250 sends credit message = 4 KB back to NP 1 | 2 | 4 KB | 0 KB |
| 34 | NP 1 receives credit message = 4 KB and increments Cur_Buf[1] | 2 | 8 KB | 0 KB |
| 35 | (2 + 1) * 2 KB <= 8 KB, so NP 1 gives 1 BB Credit; only 1 because 3 = Max_BB Credit | 3 | 4 KB | 0 KB |

In one exemplary embodiment of the BB Credit buffer scheme of the present invention, one frame occupies one buffer/credit. Typically, one buffer contains usually 2 KB of memory. Thus, a small frame pocket of 36 bytes, for example, still consumes an entire 2 KB of memory. Accordingly, for another exemplary embodiment of the BB Credit scheme, several smaller frame packets may be logically grouped and associated with a single buffer. For example, several small frames of about 36 bytes may be collapsed into one 2 KB buffer. The system may keep track of the ordering via hardware logic. For example, the system may maintain a scoreboard to track the order in which the frame packets are to be sent. In this exemplary embodiment, the system maximizes the number of available credit for larger frames and thus potentially increases the throughput between the sender and receiver.

The presently disclosed flow control schemes provide a number of advantages. One advantage of the present invention is that the flow control scheme substantially eliminates head of line (HOL) blocking. As discussed above Fibre Channel standards define link-level and end-to-end congestion control protocols but these standard protocols do not eliminate head of line (HOL) blocking. HOL blocking is a problem for internal switching that occurs when several packets at the head of an input queue block packets from being forwarded to output ports. The dynamic BB Credit flow control scheme prevents problems caused by HOL blocking such as increased system latency, unintentionally dropped packets, and time-out problems.

Another advantage of the presently disclosed flow control schemes is that they allow for more efficient data streaming. Instead of frame based flow control that does not account for frame size, the dynamic BB Credit flow control scheme provides byte-based connectivity between the ingress and egress network processors. The ingress network processor is permitted to send a predefined amount of traffic to the egress network processor. This flow control scheme allows for the system to dynamically give BB Credits based on the amount of buffering available.

The invention, therefore, is well adapted to carry out the objects and attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method for providing buffer-to-buffer credit port-level flow control for a computer network in operative communication with a plurality of ingress and egress network processors, each having an egress port and an ingress port that is associated with a buffer-to-buffer credit value corresponding to the current number of frames the ingress port sends, a buffer value corresponding to the current total frame size the ingress port sends, and a pending buffer-to-buffer value corresponding to the pending buffer-to-buffer credits an egress port issues the ingress port, and a set of network processors is associated with a bridge, the method comprising the steps of:

sending a frame from the ingress port to a destination egress port, if the ingress port has a sufficient buffer-to-buffer credit value and buffer value;

decrementing the buffer-to-buffer credit value associated with the ingress port;

decrementing the buffer value associated with the ingress port;

determining whether to increment the buffer-to-buffer credit value associated with the ingress port by incrementing the buffer-to-buffer credit value associated with the ingress port if the product of one plus the buffer-to-buffer credit value times the maximum frame size in bytes is less than or equal to a minimum egress buffering value; the minimum egress buffering value corresponds to the minimum amount of egress buffering that is available for any one egress port;

incrementing the pending credit value associated with the ingress port;

determining whether to send a credit message to the ingress port;

the computer network further comprises a switch fabric: and wherein the network processors are in operative communication with the switch fabric via the associated bridge.

2. The method of claim 1, wherein the step of determining whether to send a credit message to the ingress port further comprises:

sending the credit message if the pending credit value is greater than, or equal to, a credit watermark value.

3. The method of claim 2, further comprising the step of: increasing the buffer value if the credit message is sent.

4. A system for providing buffer-to-buffer credit port-level flow control for a computer network in operative communication with a plurality of ingress and egress network processors, said system comprising:

a plurality of ingress and egress network processors, each of said plurality of network processors having an egress port and an ingress port that is associated with a buffer-to-buffer credit value corresponding to the current number of frames the ingress port sends, a buffer value corresponding to the current total frame size the ingress port sends, and a pending buffer-to-buffer value corresponding to the pending buffer-to-buffer credits an egress port issues the ingress port, and a set of said plurality of network processors is associated with a bridge, wherein:

a frame is sent from the ingress port to a destination egress port, if the ingress port has a sufficient buffer-to-buffer credit value and buffer value;

the buffer-to-buffer credit value associated with the ingress port is decremented;

the buffer value associated with the ingress port is decremented;

the buffer-to-buffer credit value associated with the ingress port is determined whether to be incremented, the buffer-to-buffer credit value associated with the ingress port is incremented if the product of one plus the buffer-to-buffer credit value times the maximum frame size in bytes is less than or equal to a minimum egress buffering value, the minimum egress buffering value corresponds to the minimum amount of egress buffering that is available for any one egress port;

the pending credit value associated with the ingress port is incremented;

a credit message to the ingress port is determined whether to be sent;

the computer network further comprises a switch fabric; and wherein the network processors are in operative communication with the switch fabric via the associated bridge.

5. The system of claim 4, wherein when the pending credit value is greater than, or equal to, a credit watermark value the credit message is sent to the ingress port.

6. The system of claim 5, further comprising the buffer value is increased if the credit message is sent.

* * * * *